Patented Feb. 27, 1951

2,543,614

UNITED STATES PATENT OFFICE 2,543,614

SELECTIVE ADSORPTION OF OLEFINS

John Watson Teter, Chicago, Ill., assignor to Sinclair Refining Company, New York, N. Y., a corporation of Maine No Drawing. Application June 28, 1947,
Serial No. 757,903

1 Claim. (Cl. 260—674)

This invention relates to improvements in the separation of components of a homogeneous hydrocarbon mixture by selective adsorption or absorption of one or more of the components from the mixture by means of a solid having selectivity of absorption or adsorption with respect to the components of the mixture.

The invention provides an improved method for concentrating or isolating aromatic, olefinic or acetylenic compounds from mixtures thereof with paraffinic or naphthenic compounds, or both, and comprises the selective adsorption or absorption of the olefinic, aromatic, or acetylenic compounds, or mixtures thereof, by means of a sulphide of a metal of the group consisting of tungsten, molybdenum, nickel, cobalt, iron and zinc.

I cannot at present state, with certainty, whether the selective separation is due to adsorption or absorption or a combination of the two. I shall, however, without distinction, refer to the action, herein, as adsorption and to the metal sulphide as an adsorbent.

The concentration, or isolation, of the aromatic, olefinic, or acetylenic compounds, or mixtures thereof, from homogeneous mixtures of hydrocarbon may be effected, in accordance with my present invention, by passing the hydrocarbon mixture, at low to moderate temperatures, and under moderately elevated pressures, in contact with the sulphide adsorbent, whereby the desired materials are selectively adsorbed, and thereafter recovering the adsorbed material from the adsorbent in a zone isolated from the hydrocarbon mixture.

This recovery, or desorption, may be effected, either by heating the adsorbent, or by subjecting the adsorbent to reduced pressures, or by displacing the adsorbent compounds from the adsorbent by treatment with another hydrocarbon, or with a polar organic compounds, such as alcohol, ether, nitrile, or the like, or by steam or water.

A single sulphide of the group may be used alone as the adsorbent or in admixtures with other sulphides, or one or more of the sulphides may be used suspended on, or admixed with, a carrier or support, such, for instance, as silica gel, alumina, titania, zirconia, magnesia, charcoal, coke, clays, earths, diatomaceous silica, or the like.

An advantage of my present invention is that mixed hydrocarbons, regardless of their sulfur content, may be treated for the selective adsorption of aromatic, olefinic, or acetylenic compounds, without seriously contaminating the desorbent.

The temperatures used in the adsorption and desorption steps of the operation are subject to some variation, depending upon the concentration of the desired constituents in the mixture. Advantageously, the adsorption is effective at a temperature within the range of 0 to 300° F. and at a pressure within the range of 5 to 500 pounds per square inch. The desorption is, with advantage, effected, as previously noted, by increasing the temperature or by lowering the pressure or by a combination of increased temperature and reduced pressure. An alternative procedure, as previously noted, for effecting the desorption is by displacing the adsorbed material with a compound, such as previously noted.

I claim:

A process for the selective adsorption of olefinic hydrocarbons present in a homogeneous hydrocarbon mixture which comprises passing the homogeneous hydrocarbon mixture in contact with a sulfide of a metal selected from the group consisting of tungsten, molybdenum, nickel, cobalt, iron and zinc at a temperature in the range of about 0 to 300° F., whereby the olefinic hydrocarbons are selectively adsorbed by the sulfide, and then removing said adsorbed hydrocarbons from the sulfide adsorbent by desorption.

JOHN WATSON TETER.

REFERENCES CITED

The following references are of record in the file of this patent:

UNITED STATES PATENTS

| Number | Name | Date |
|---|---|---|
| 2,395,491 | Mavity | Feb. 26, 1946 |
| 2,398,101 | Lipkin | Apr. 9, 1946 |
| 2,407,180 | Schiller et al. | Sept. 3, 1946 |
| 2,414,951 | Jasaitis et al. | Jan. 28, 1947 |
| 2,415,315 | Walter et al. | Feb. 4, 1947 |